US008907568B2

(12) United States Patent
Jin

(10) Patent No.: US 8,907,568 B2
(45) Date of Patent: Dec. 9, 2014

(54) METHOD AND APPARATUS FOR LED STRING SHORT CIRCUIT DETECTION AND PROTECTION

(71) Applicant: Microsemi Corporation, Aliso Viejo, CA (US)

(72) Inventor: Xiaoping Jin, Orange, CA (US)

(73) Assignee: Microsemi Corporation, Aliso Viejo, CA (US)

( * ) Notice: Subject to any disclaimer, the term of this patent is extended or adjusted under 35 U.S.C. 154(b) by 65 days.

(21) Appl. No.: 13/652,495

(22) Filed: Oct. 16, 2012

(65) Prior Publication Data

US 2013/0099670 A1 Apr. 25, 2013

Related U.S. Application Data

(60) Provisional application No. 61/550,502, filed on Oct. 24, 2011.

(51) Int. Cl.
*H05B 37/03* (2006.01)
*H05B 33/08* (2006.01)

(52) U.S. Cl.
CPC ........ *H05B 33/0815* (2013.01); *H05B 33/0893* (2013.01); *Y02B 20/341* (2013.01)
USPC ........................................................ 315/120

(58) Field of Classification Search
CPC . H05B 33/0881; H05B 37/02; H05B 33/0884
See application file for complete search history.

(56) References Cited

U.S. PATENT DOCUMENTS

| | | | | | |
|---|---|---|---|---|---|
| 6,087,932 | A | * | 7/2000 | Belgard | 340/468 |
| 2002/0140380 | A1 | * | 10/2002 | Biebl | 315/291 |
| 2002/0140433 | A1 | * | 10/2002 | Lawson et al. | 324/509 |
| 2004/0021431 | A1 | * | 2/2004 | Bruwer et al. | 315/291 |
| 2004/0080273 | A1 | * | 4/2004 | Ito et al. | 315/77 |
| 2009/0009362 | A1 | * | 1/2009 | Miller | 340/907 |
| 2009/0085576 | A1 | * | 4/2009 | Lenzie et al. | 324/510 |
| 2010/0289982 | A1 | * | 11/2010 | Akiyama et al. | 349/61 |
| 2011/0175547 | A1 | * | 7/2011 | Oh et al. | 315/294 |
| 2012/0062148 | A1 | * | 3/2012 | Kim et al. | 315/297 |
| 2012/0112647 | A1 | * | 5/2012 | Dinc | 315/186 |

* cited by examiner

*Primary Examiner* — Alexander H Taningco
*Assistant Examiner* — Christine Johnson
(74) *Attorney, Agent, or Firm* — Simon Kahn

(57) ABSTRACT

An apparatus for LED string short circuit detection constituted of: a constant current drive circuit; a plurality of LED strings, a first end of each of the plurality of LED strings coupled to a common output of the constant current drive circuit; a first sense resistor coupled between a second end of each of the plurality of LED strings and a chassis; a second sense resistor coupled between the chassis and a return of the constant current drive circuit; and a comparing circuit arranged to compare the amount of current flow through the first sense resistor with amount of current flow through the second sense resistor, the comparing circuit arranged to assert a fault signal in the event that the amount of current flow through the second sense resistor exceeds the current flow through the first sense resistor by a predetermined minimum value.

11 Claims, 5 Drawing Sheets

METHOD AND APPARATUS FOR LED STRING SHORT CIRCUIT DETECTION AND PROTECTION

CROSS-REFERENCE TO RELATED APPLICATIONS

This application claims priority from U.S. Provisional Patent Application Ser. No. 61/550,502 filed Oct. 24, 2011, the entire contents of which is incorporated herein by reference.

BACKGROUND OF THE INVENTION

The present invention relates to the field of solid state lighting, and in particular to an arrangement driving one or more LED strings wherein a short circuit to ground is detected and driving is interrupted.

Light emitting diodes (LEDs), and in particular high intensity and medium intensity LED strings, are rapidly coming into wide use for lighting applications. LEDs with an overall high luminance are useful in a number of applications including backlighting for liquid crystal display (LCD) based monitors and televisions, collectively hereinafter referred to as a matrix display, as well as for general lighting applications.

In a large LCD matrix display, and in large solid state lighting applications, such as street lighting and signage, the LEDs are typically supplied in a plurality of strings of serially connected LEDs, the strings connected to a power source in parallel at least in part so that in the event of failure of one string at least some light is still output. The constituent LEDs of each LED string thus share a common current.

Similarly LED based lighting, also known as solid state lighting, is favored due to its high efficiency, long life, mechanical compactness and robustness, and low voltage operation. Because of the limited power capacity of a single LED device, in most applications multiple LED's are connected in series to form an LED string, wherein all of the constituent LEDs share a common current. Furthermore, as described above, multiple LED strings are typically provided either in parallel, or separately driven, to produce the desired overall light intensity.

LED strings exhibit a particular voltage to current relationship, wherein for a voltage below a minimum operating voltage no appreciable current flows, and for voltages exceeding the minimum operating voltage the current follows an exponential curve responsive to the voltage. As a result, driving of LED strings is typically performed by a constant current source, i.e. a driver which produces a fixed output current irrespective of the voltage developed across the load. Such a constant current source can be of a linear type or of a switching type, wherein the LED current is maintained at a constant pre-determined level with a control mechanism.

In practical mass production of such a multiple LED string lighting apparatus, and especially in display backlight applications, there is a possibility that at some point a LED string is shorted to a metal chassis. Such a short circuit would cause an electronic device failure or a safety hazard when electrical power is applied to the system. The constant current source will continue to drive the designed current through the normal LED strings, with the current of the shorted string bypassing the sense element, and thus not being part of the control feedback loop. Such a situation is dangerous but cannot be detected by the normal sense feedback, which is arranged to ensure that current through the sense element meets a predetermined target. Thus, the loop of the prior art leads to a hazardous situation in the event of such a short circuit.

SUMMARY OF THE INVENTION

Accordingly, it is a principal object of the present invention to overcome at least some of the disadvantages of the prior art. This is provided in certain embodiments by a detection technique arranged to identify such a short circuit condition and take protective action to prevent system failure and safety hazards. In particular, an isolated LED drive with a constant current source is provided, and a control circuit is arranged to drive the isolated LED drive by alternately opening and closing at least one electronically controlled switch. The positive output of the DC supply is coupled to the anode end of the LED string, or to each of the parallel connected LED strings, respectively. A first sense resistor is coupled between the cathode end of the LED string, or parallel connected LED strings, respectively, and the chassis ground. A second sense resistor is coupled between the chassis and the negative return node of the DC supply. Current through the first sense resistor is compared with current through the second sense resistor, and in the event of a difference greater than a predetermined value, a short circuit error is detected, and a short circuit signal is asserted. The short circuit signal is coupled to an input of the control circuit, and the control circuit preferably ceases the production of power for the LED strings responsive to the asserted short circuit signal.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF PREFERRED EMBODIMENTS

Figure 1:
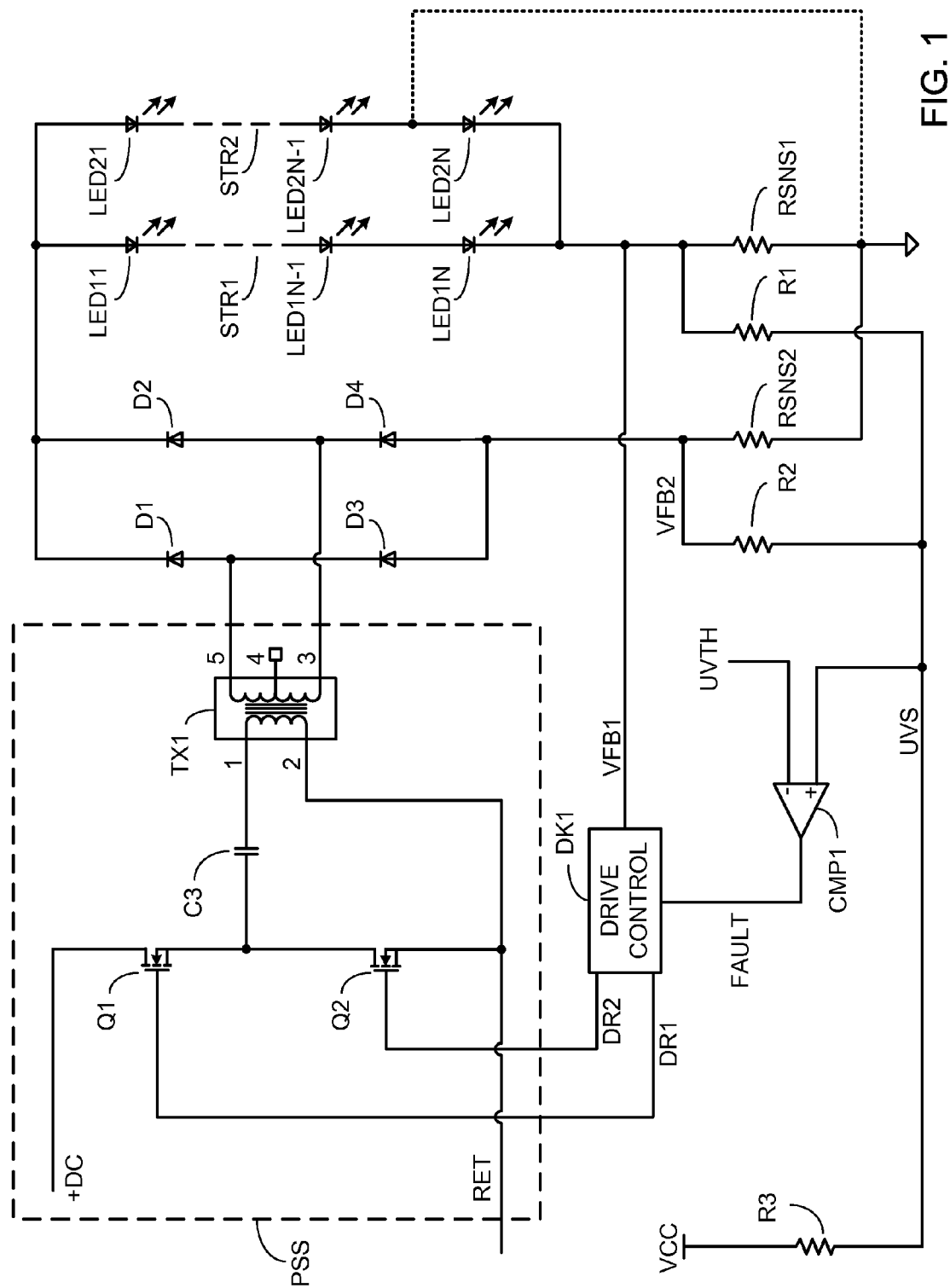
FIG. 1 illustrates a high level schematic diagram of an exemplary short circuit detection and protection scheme comprising an isolated LED drive in cooperation with a full wave rectifier bridge circuit.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting. The term winding is particularly meant to mean a winding of electrically conducting wire forming an inductor. The winding may form a stand alone inductor, or be magnetically coupled to another winding forming a transformer.

FIG. 1 illustrated an embodiment of a short circuit and detection scheme arranged for operation with two parallel connected LED strings, denoted STR1 and STR2, respectively driven by a power supply stage PSS comprising: a switching network, comprising transistors Q1 and Q2, a capacitor C3 and a transformer TX1. LED string STR1 comprises a plurality of serially connected LEDs, particularly N LEDs, and the N LEDs are denoted respectively LED11, LED1N-1 and LED1N. LED string STR2 comprises a plurality of serially connected LEDs, particularly N LEDs, and the N LEDs are denoted respectively LED21, LED2N-1 and LED2N. The short circuit and detection scheme of FIG. 1 further comprises: a plurality of diodes, denoted respectively diodes D1, D2, D3 and D4; a first sense resistor RSNS1; a second sense resistor RSNS2; a plurality of resistors denoted respectively resistor R1, R2 and R3; a comparing circuit CMP1; a voltage reference UVTH; and a drive control circuit DK1. Comparing circuit CMP1 is illustrated as a comparator for ease of understanding.

The drain of transistor Q1 is connected to a source of DC power, denoted +DC, and the source of transistor Q2 is connected to the return lead of the source of DC power, denoted RET. The source of transistor Q1 is connected to the drain of transistor Q2 and to a first end of capacitor C3. A second end of capacitor C3 is connected to a first end of a primary winding of transformer TX1, denoted pin 1, and a second end of the primary winding of transformer TX1, denoted pin 2, is connected to the source of transistor Q2. The gate of transistor Q1 is connected to an output of drive control circuit DK1 denoted DR1 and the gate of transistor Q2 is connected to an output of drive control circuit DK1 denoted DR2.

A first end of a secondary winding of transformer TX1, denoted pin 5, is connected to the anode of diode D1 and to the cathode of diode D3. A second end of the secondary winding of transformer TX1, denoted pin 3, is connected to the anode of diode D2 and the cathode of diode D4. The cathodes of diodes D1 and D2 are connected to the anode end of LED string STR1 and to the anode end of LED string STR2, i.e. to the anode of LED LED11 and LED LED21. The cathode end of LED string STR1, i.e. the cathode of LED LED1N, and the cathode end of LED string STR2, i.e. the cathode of LED LED2N, are commonly connected to a first end of first sense resistor RSNS1, to a first end of resistor R1 and to an input of drive control circuit DK1, the signal labeled VFB1. A second end of first sense resistor RSNS1 is connected to the chassis.

A second end of resistor R1 is connected to the non-inverting input of comparator CMP1, which is denoted UVS, and via resistor R3 to a voltage VCC. A first end of second sense resistor RSNS2 is commonly connected to the anodes of diodes D3 and D4, is denoted VFB2, and is further connected via resistor R2 to the non-inverting input of comparator CMP1. A second end of second sense resistor RSNS2 is connected to the chassis. The inverting input of comparator CMP1 is connected to a reference voltage UVTH. The output of comparator CMP1, denoted FAULT, is connected to an input of drive control circuit DK1.

In operation, the switching network of transistors Q1 and Q2 is arranged to feed switched power to a primary winding of transformer TX1. The switched power is output from a secondary winding of transformer TX1, and converted to DC power by a full wave rectifier circuit consisting of diodes D1, D2, D3 and D4. Transistors Q1 and Q2 are controlled by respective outputs of drive control circuit DK1, the outputs respectively denoted DR1 and DR2. While a half bridge supply is illustrated, this is not meant to be limiting in any way, and the short circuit and detection scheme described herein is equally applicable to any type of supply arrangement which provides DC drive power to LED strings STR1 and STR2.

The cathodes of diodes D1 and D2 represent the positive output of the full wave rectifier circuit, by virtue of the anode of diode D1 connected to a first end of the secondary winding of transformer TX1 and the anode of diode D2 connected to a second end of the secondary winding of transformer TX1. The anodes of diodes D3 and D4 represent the return of the full wave rectifier circuit, by virtue of the cathode of diode D3 connected to the anode of diode D1 and the cathode of diode D4 connected to the anode of diode D2.

No balancing circuit is illustrated between LED strings STR1 and STR2, and the current through the parallel connected LED strings are assumed to be reasonably equal by selecting matched LED strings STR1 and STR2, however this is not meant to be limiting in any way. A balancing circuit may be added without exceeding the scope. In addition, one or more smoothing capacitor may be provided in parallel with LED strings STR1, STR2, without exceeding the scope. Only two LED strings are illustrated, however this is not meant to be limiting in any way and additional LED strings, or only a single LED string may be implemented without exceeding the scope.

It is known in the prior art to provide a sense resistor in the path of LED current in order to sense the amount of LED current, and thus as illustrated first sense resistor RSNS1 is provided, however first sense resistor RSNS1 is connected between the common cathode ends of LED strings STR1 and STR2 and the chassis, with the first end of first sense resistor RSNS1 connected to an input of drive control circuitry DK1 as signal VFB1.

As indicated above, drive control circuitry DK1 is typically arranged to provide a constant current drive, and therefore the amount of current passing through the LED strings is sensed as a voltage drop across sense resistor RSNS1 and fed back to drive control circuitry DK1 as a signal VFB1 to ensure that the target current is produced. Drive control circuitry DK1 is arranged to compare signal VFB1 to a preset internal reference voltage in a closed control loop so as to maintain feedback signal VFB1 to be equal to the preset internal reference voltage.

Innovatively, second sense resistor RSNS2 is provided in the return path of the LED current loop. In particular, sense resistor RSNS2 is coupled between the chassis and the anodes of diodes D3 and D4 and thus, the anode of diodes D3 and D4 are at a potential lower than the potential of the chassis.

Under normal operation the currents flowing through first sense resistor RSNS1 is equal to the current flowing through second sense resistor RSNS2, as both represent the total current of the LED strings. However, when a point of a particular LED string is shorted to the chassis, as shown in FIG. 1 represented by a dotted line, the current of the shorted LED string does not flow through first sense resistor RSNS1, but still flows through second sense resistor RSNS2. As a result, the current flowing through second sense resistor RSNS2 is larger than the current flowing through first sense resistor RSNS1, with the magnitude of the difference equal to the current of the shorted LED string. Drive control circuitry DK1 will increase its current output so that feedback signal VFB1, representing the current flowing through the non-short circuited LED string, matches the preset internal reference voltage. The absolute value of the negative sense voltage VFB2 across sense resistor RSNS2 increases.

In order to utilize such a signal change for short circuit detection, a comparator circuit is employed. The non-inverting input of comparator CMP1 is connected to pre-determined reference voltage UVTH. The inverting input of comparator CMP1 is connected to a resistor network comprising resistors R1, R2, and R3, with R1 coupled between node UVS and the first end of first sense resistor RSN1 and R2 coupled between node UVS and the first end of second sense resistor RSNS2. Node UVS is further connected to voltage VCC via resistor R3. The value selection of resistors R1, R2 and R3 is arranged to set the voltage at the inverting input of comparator CMP1 such that at normal operating condition, i.e. when there is no short circuit from any LED strings to the chassis, the voltage at the inverting input of comparator CMP1 is slightly higher than reference voltage UVTH at the non-inverting input of comparator CMP1. In such an event, the output of comparator CMP1 stays at a low state to indicate a normal operating condition, and signal FAULT is not asserted.

In the event that a short circuit from any LED string to chassis occurs, VCC and node VFB1 remain largely constant, and the negative amplitude at node VFB2 increases and thus pulls the voltage of the inverting input of comparator CMP1, i.e. node UVS, in the negative direction. Once UVS becomes lower, i.e. more negative, than reference UVTH, the output of comparator CMP1 changes from the low state to the high state, i.e. signal FAULT is asserted, thereby indicating a fault condition to drive control circuit DK1.

Preferably, a timing circuit is provided in drive control circuit DK1 to take protective action such as shutting down drive signals DR1 and DR2, after a predetermined time, the predetermined time period selected so as to protect against noise, so as to thereby protect the system in the event that such a fault condition exists.

The value selection of sense resistors RSNS1 and RSNS2, and resistors R1, R2 and R3 can assume different combinations so as to satisfy the condition that during normal operation UVS>UVTH, and when a LED string is shorted to chassis UVS<UVTH. In one particular embodiment, the value of first sense resistor RSNS1=the value of second sense resistor RSNS2 and the value of resistor R1=the value of resistor R2. Thus for normal operating conditions, the contribution of nodes VFB1 and VFB2 to the voltage at node UVS connected to the inverting input of comparator CMP1 cancel each other, resulting in a simple expression for node UVS, as will be described further below.

Figure 2:
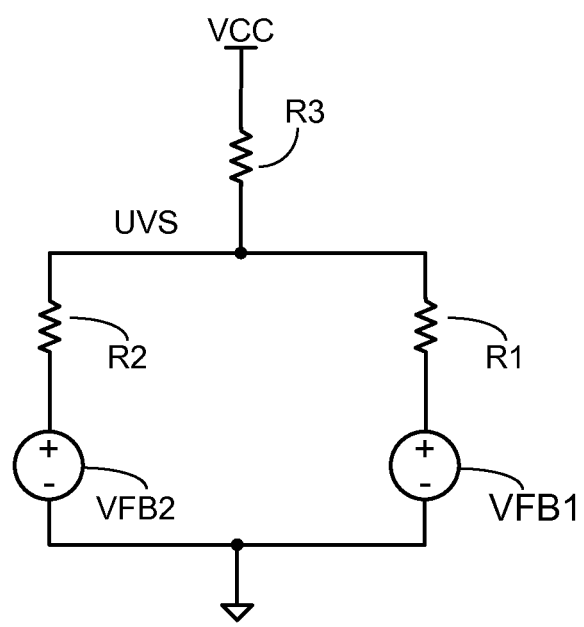
FIG. 2 illustrates an equivalent circuit of the comparator voltage tree of FIG. 1.

An equivalent circuit for the voltage at node UVS is illustrated in FIG. 2. Since the value of sense resistors RSNS1 and RSNS2 is much smaller than the value of resistors R1, R2 and R3, their resistance can be neglected in determining the voltage at node UVS without noticeable effect to the calculation accuracy, therefore in FIG. 2 the signals sensed across RSNS1 and RSNS2 are represented with two ideal voltage sources VFB1 and VFB2, respectively. From FIG. 2 the voltage at node UVS can be expressed by a linear overlap of the contribution from the three voltage sources VFB1, VFB2 and VCC and results in:

$$UVS=VCC\cdot[(R1\cdot R2)/(R1+R2)]/\{R3+[(R1\cdot R2)/(R1+R2)]\}+VFB1\cdot[(R3\cdot R2)/(R3+R2)]/\{R1+[(R3\cdot R2)/(R3+R2)]\}+VFB2\cdot[(R3\cdot R1)/(R3+R1)]/\{R2+[(R3\cdot R1)/(R3+R1)]\}$$  EQN. 1

When RSNS1=RSNS2, VFB2=−VFB1, and the contribution of VFB1 and VFB2 cancel each other out. When the value of resistor R1=the value of resistor R2, EQN. 1 reduces to:

$$UVS=VCC\cdot[(R1\cdot R2)/(R1+R2)]/\{R3+[(R1\cdot R2)/(R1+R2)]\}$$  EQN. 2

Preferably, the voltage at node UVS is set to be slightly above reference voltage UVTH at normal operation condition according to EQN. 2. When a short circuit occurs between a LED string and the chassis, node VFB2 becomes more negative and pulls the sense signal at node UVS below reference voltage UVTH thus triggering comparator DK1 to assert signal FAULT.

Other value combinations for resistors R1, R2, R3 and first sense resistor RSNS1 and second sense resistor RSNS2 can also be adopted without exceeding the scope. There is no requirement that the value of first sense resistor RSNS1 be equal to the value of second sense resistor RSNS2, or that the value of resistors R1 and R2 be necessarily equal. At an extreme, resistor R1 may be infinity and thus removed from the circuit. However, the advantage of providing matched values for first and second sense resistors RSNS1 and RSNS2, and for resistors R1 and R2, is that if there is a ripple content in the LED current, the effect of the ripple current to node UVS is canceled by such value matching at normal operating conditions, thereby resulting in a more reliable short circuit detection. The signal connection of comparator CMP1 can also be reversed, in which case the logic state of fault indication is also reversed; with a low state indicating a fault. As indicated above, comparator CMP1 is a particular embodiment of a comparing circuit, and the use of a comparator is not meant to be limiting in any way.

Figure 3:
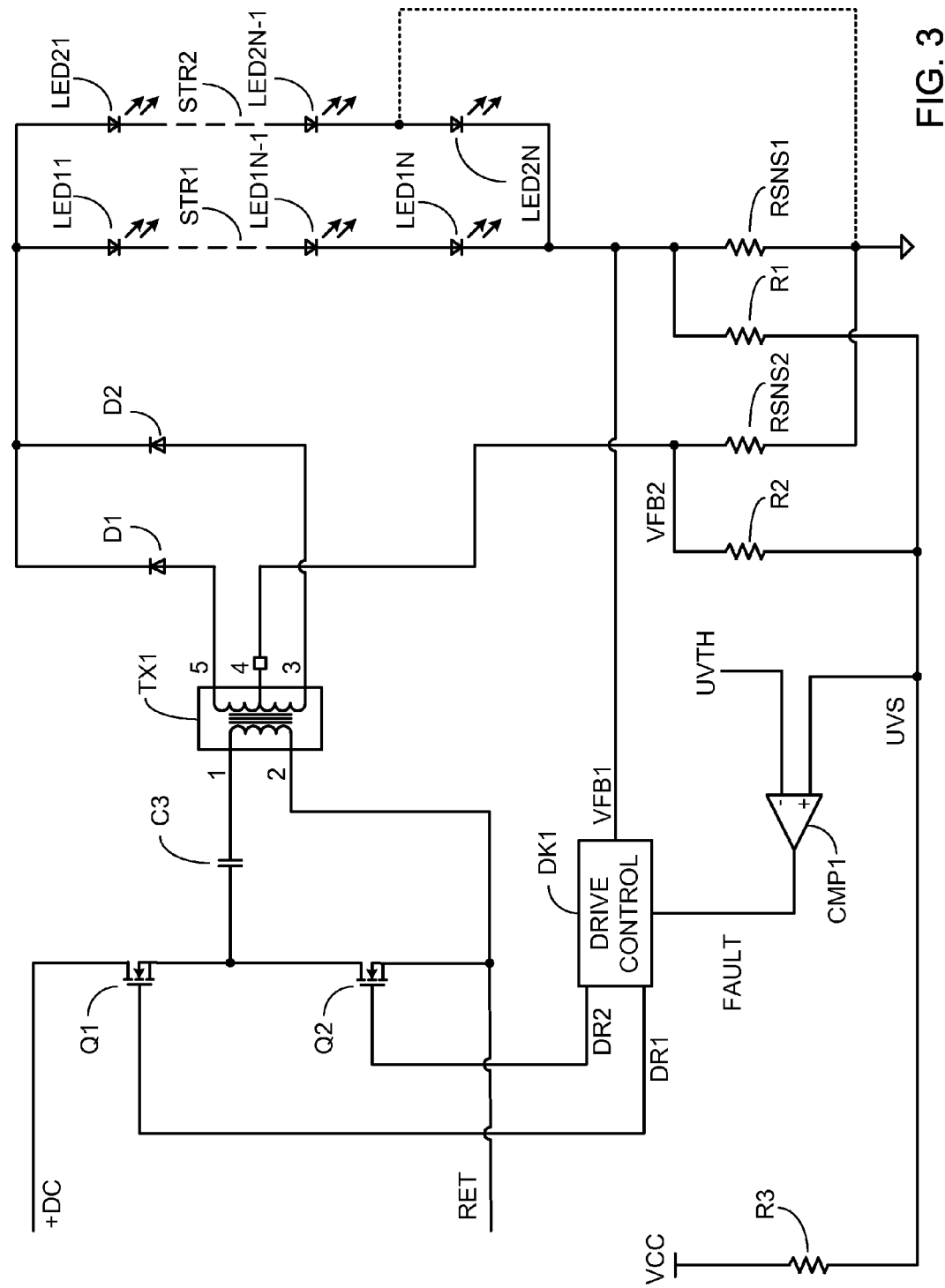
FIG. 3 illustrates a high level schematic diagram of an exemplary short circuit detection and protection scheme comprising an isolated drive in cooperation with a full wave rectifier circuit, wherein a center tap of a transformer secondary winding is utilized as a common return.

FIG. 3 illustrates a high level schematic diagram of an exemplary short circuit detection and protection scheme comprising an isolated LED driver in cooperation with a full wave rectifier circuit, wherein a center tap of a transformer secondary winding is utilized as a common return. The arrangement is in all respects similar to the arrangement of FIG. 1 with the exception that in place of the full wave bridge rectifier circuit of diodes D1, D2, D3 and D4, a full wave rectifier circuit comprising only diodes D1 and D2 is provided, with the center tap connection of the secondary winding of transformer TX1, denoted pin 4, utilized as the common return.

In some detail, the first end of the secondary winding of transformer TX1, denoted pin 5, is connected to the anode of diode D1 and the second end of the secondary winding of transformer TX1, denoted pin 3, is connected to the anode of diode D2. The cathodes of diodes D1 and D2 are commonly connected to the anode end of LED strings STR1 and STR2. Node VFB2 is connected to the center tap connection of the secondary winding of transformer TX1.

The operation of the circuit of FIG. 3 is in all respects identical to that of FIG. 1, and thus in the interest of brevity is not further detailed.

Figure 4:
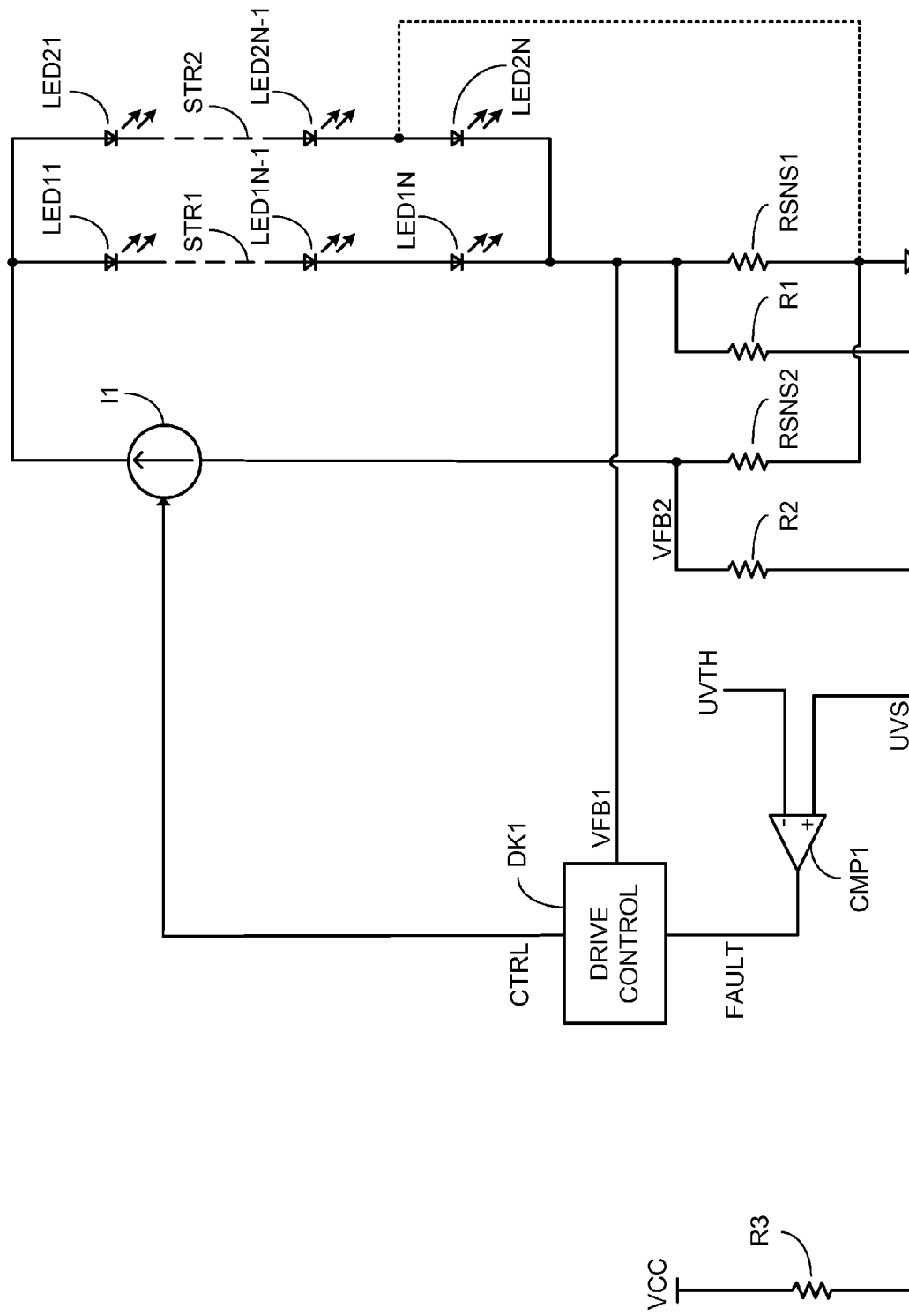
FIG. 4 illustrates a high level schematic diagram of an exemplary short circuit detection and protection scheme comprising an idealized current source controlled by a drive control circuit.

FIG. 4 illustrates a high level schematic diagram of an exemplary short circuit detection and protection scheme comprising an idealized current source controlled by a drive control circuit. In particular, the driving electronics of FIG. 3, namely Q1, Q2, C3, TX1, D1 and D2 are simplified to a controlled current source I1, and drive control outputs DR1, DR2 of FIG. 3 are replaced with a single output CTRL. Output CTRL is arranged to alternately enable and disable current source I1, responsive to inputs FAULT and VFB1. Alternately, output CTRL may further control the amount of current produced by current source I1, responsive to input VFB1, and set the current produced by current source I1 to zero responsive to an active FAULT input. Operation of the balance of FIG. 4 is in all respects identical to the operation of the arrangement of FIG. 3, and in the interest of brevity will not be further described.

Figure 5:
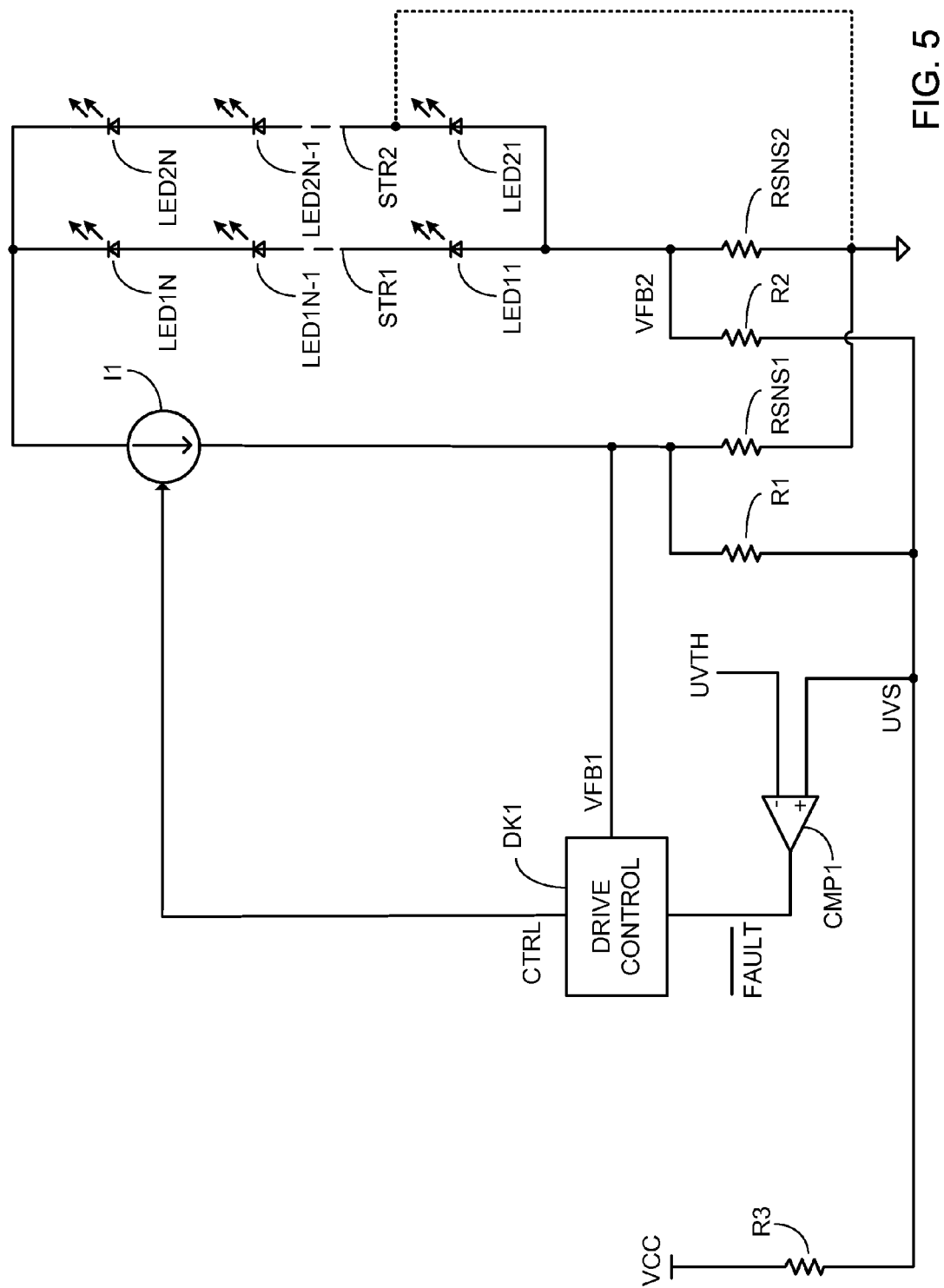
FIG. 5 illustrates a high level schematic diagram of an exemplary short circuit detection and protection scheme comprising an idealized current source controlled by a drive control circuit, wherein the sense resistors are coupled to the anode end of the LED strings.

The above arrangements have been illustrated with sense resistors RSNS1, RSNS2 coupled to the cathode end of LED strings STR1, STR2, however this is not meant to be limiting in any way. FIG. 5 illustrates the arrangement of FIG. 4 with sense resistors RSNS1, RSNS2 coupled to the anode ends of LED strings STR1, STR2, respectively.

In some detail, the return of current source I1 is connected to the cathodes of each of LED strings STR1, STR2. Output CTRL of drive control DK1 is connected to the control input of current source I1. The anode ends of LED strings STR1, STR2 are commonly connected to a first end of each of second sense resistor RSNS2 and resistor R2, the signal labeled VFB2. A second end of second sense resistor RSNS2 is connected to the chassis.

A second end of resistor R2 is connected to the non-inverting input of comparator CMP1, which is denoted UVS, and via resistor R3 to a voltage VCC. A first end of first sense resistor RSNS1 is commonly connected to output of current source I1, is denoted VFB1, and is further connected via resistor R1 to the non-inverting input of comparator CMP1 and to the control input of drive control circuit DK1. A second end of first sense resistor RSNS1 is connected to the chassis. The inverting input of comparator CMP1 is connected to a reference voltage UVTH. The output of comparator CMP1, denoted FAULT, is connected to an input of drive control circuit DK1.

In operation, when any of LED string STR1 or STR2 is shorted to chassis, the current flowing through first sense resistor RSNS1 is maintained at the pre-determined value due to the operation of drive control circuit DK1, whereas the current flowing through second sense resistor RSNS2 is reduced, resulting in a positive rise of signal UVS. Such a change is detected by the detection circuit as described above in relation to FIG. 1. Preferably, detection signal UVS is set to be slightly below UVTH for normal operation, by proper selection of R1, R2 and R3 so that when a short circuit occurs UVS rises over UVTH, resulting in a high state from the output of CMP1 to indicate a fault, as illustrated by the bar over FAULT.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated herein by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described herein above. Rather the scope of the present invention is defined by the appended claims and includes both combinations and sub-combinations of the various features described hereinabove as well as variations and modifications thereof which would occur to persons skilled in the art upon reading the foregoing description and which are not in the prior art.

I claim:

1. An apparatus for LED string short circuit detection comprising:
    a constant current drive circuit;
    a plurality of LED strings, a first end of each of said plurality of LED strings coupled to a common output lead of said constant current drive circuit;
    a first sense resistor coupled between a second end of each of said plurality of LED strings and a chassis;
    a second sense resistor coupled between the chassis and a return of said constant current drive circuit; and
    a comparing circuit arranged to compare an amount of current flowing through said first sense resistor with an amount of current flowing through said second sense resistor, said comparing circuit arranged to assert a fault signal in the event that the amount of current flowing through said second sense resistor exceeds the amount of current flowing through said first sense resistor by a predetermined minimum value.

2. The apparatus of claim 1, further comprising a drive control circuit arranged to receive said fault signal, said constant current drive circuit responsive to said drive control circuit, said drive control circuit arranged to disable said constant current drive circuit responsive to said asserted fault signal.

3. The apparatus of claim 2, wherein said drive control circuit is further arranged to:
    receive an indication of the amount of current flowing through said first sense resistor; and
    control an amount of current output by said constant current drive circuit responsive to said received indication.

4. The apparatus of claim 1, wherein said constant current drive circuit is an isolated drive circuit.

5. A method of LED string short circuit detection comprising:
    providing a constant current drive circuit;
    providing a plurality of LED strings, a first end of each of said plurality of LED strings coupled to a common output of said provided constant current drive circuit;
    providing a first sense resistor coupled between a second end of each of said plurality of LED strings and a chassis;
    providing a second sense resistor coupled between the chassis and a return of said constant current drive circuit;
    comparing an amount of current flowing through said provided first sense resistor with an amount of current flowing through said provided second sense resistor; and
    asserting a fault signal in the event that the amount of current flowing through said provided second sense resistor exceeds the amount of current flowing through said provided first sense resistor by a predetermined minimum value.

6. The method of claim 5, further comprising:
disabling said provided constant current drive circuit responsive to said asserted fault signal.

7. The method of claim 5, further comprising:
receiving an indication of the amount of current flowing through said first sense resistor; and
controlling an amount of current output by said provided constant current drive circuit responsive to said received indication.

8. An apparatus for LED string short circuit detection comprising:
a means for providing a constant drive current;
a plurality of LED strings, a first end of each of said plurality of LED strings coupled to a common output lead of said means for providing the constant drive current;
a first means for current sensing coupled between a second end of each of said plurality of LED strings and a chassis;
a second means for current sensing coupled between the chassis and a return of said means for providing the constant drive current; and
a means for comparing arranged to compare an amount of current flowing through said first means for current sensing with an amount of current flowing through said second means for current sensing, said means for comparing arranged to assert a fault signal in the event that the amount of current flowing through said second means for current sensing exceeds the amount of current flowing through said first means for current sensing by a predetermined minimum value.

9. The apparatus of claim 8, further comprising a drive control circuit arranged to receive said fault signal, said means for providing the constant drive current responsive to said drive control circuit, said drive control circuit arranged to disable said means for providing the constant drive current responsive to said asserted fault signal.

10. The apparatus of claim 9, wherein said drive control circuit is further arranged to:
receive an indication of the amount of current flowing w through said first means for sensing current; and
control an amount of current output by said means for providing the constant drive current responsive to said received indication.

11. The apparatus of claim 9, wherein said means for providing the constant drive current is an isolated drive circuit.

* * * * *